(12) United States Patent
Kerr et al.

(10) Patent No.: US 11,286,269 B1
(45) Date of Patent: Mar. 29, 2022

(54) SYNTHESIS OF COPPER AZIDO-BASED ENERGETIC COMPOUNDS

(71) Applicant: The United States of America as Represented by the Secretary of the Navy, Indian Head, MD (US)

(72) Inventors: Andrew T. Kerr, Alexandria, VA (US); Colt T. Hendley, IV, Lanham, MD (US); Owen T. O'Sullivan, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/873,954

(22) Filed: Aug. 27, 2020

(51) Int. Cl.
*C07F 1/08* (2006.01)

(52) U.S. Cl.
CPC ........................... *C07F 1/08* (2013.01)

(58) Field of Classification Search
CPC ............................................................. C07F 1/08
See application file for complete search history.

(56) References Cited

U.S. PATENT DOCUMENTS

| | | | | |
|---|---|---|---|---|
| 4,093,623 | A * | 6/1978 | Gilligan | C06B 41/00 548/109 |
| 6,096,774 | A | 8/2000 | Bottaro et al. | |
| 6,255,512 | B1 | 7/2001 | Bottaro et al. | |
| 6,552,051 | B2 | 4/2003 | Bottaro et al. | |
| 7,375,221 | B1 | 5/2008 | Fronabarger et al. | |
| 7,399,841 | B1 | 7/2008 | Koppes et al. | |
| 8,895,736 | B1 | 11/2014 | Stern et al. | |
| 9,278,984 | B2 * | 3/2016 | Klapotke | C07F 1/08 |
| 10,196,477 | B2 | 2/2019 | Gozin et al. | |
| 10,309,212 | B2 * | 6/2019 | Schultheiss | C09K 8/03 |
| 2014/0142259 | A1 * | 5/2014 | Volz | C08F 8/42 525/539 |
| 2015/0239910 | A1 * | 8/2015 | Klapotke | C07F 1/08 548/107 |
| 2017/0226270 | A1 | 8/2017 | Gozin et al. | |
| 2019/0092895 | A1 | 3/2019 | Gozin et al. | |

OTHER PUBLICATIONS

B. Wu et al., 640 Zeitschrift fuer Anorganische und Allgemeine Chemie, 1467-1473 (2014) (Year: 2014).*
CAS Abstract and Indexed Compound B. Wu et al., 640 Zeitschrift fuer Anorganische und Allgemeine Chemie, 1467-1473 (2014) (Year: 2014).*
Y. He et al., 53 Inorganic Chemistry, 7527-7538 (2014) (Year: 2014).*
O. O'Sullivan et al., 120 Chemical Reviews, 5682-5744 (2020) (Year: 2020).*
S. Wang et al., 16 CrystEngComm, 2009-2015 (2014) (Year: 2014).*
B. Wu et al., 37 New. J. Chem., 646-653 (2013) (Year: 2013).*
M. Zhang et al., 42 New J. Chem., 13927-13932 (2018) (Year: 2018).*
S. Zhang et al., 25 Molecules, 1-42 (2020) (Year: 2020).*

* cited by examiner

*Primary Examiner* — Alexander R Pagano
(74) *Attorney, Agent, or Firm* — Fredric J. Zimmerman

(57) ABSTRACT

Methods for synthesizing in situ two energetic compounds. A first energetic compound being characterized by a first local structure that features metal centers bound by 1-tetrazole, 4-cyanobenzene and azide molecules, while a second energetic compound is characterized by a second local structure that features metal centers bound by 1-methyltetrazole and azide molecules. Both energetic compounds may further be characterized as crystalline coordination polymers (CPs).

7 Claims, 3 Drawing Sheets

SYNTHESIS OF COPPER AZIDO-BASED ENERGETIC COMPOUNDS

STATEMENT OF GOVERNMENT INTEREST

The invention described herein was made in the performance of official duties by employees of the Department of Navy and may be manufactured, used, licensed by, or for the Government of the United States of America for any governmental purpose without the payment of any royalties thereon.

FIELD OF THE INVENTION

The present invention relates to methods for synthesizing in situ first and second previously unknown energetic compounds. The first energetic compound is characterized by a local structure that features metal centers bound by 1-tetrazole, 4-cyanobenzene and azide molecules, while the second energetic compound is characterized by a local structure that features metal centers bound by 1-methyltetrazole and azide molecules. Both energetic compounds may further be characterized as crystalline coordination polymers (CPs).

BACKGROUND OF THE INVENTION

The classic solvothermal syntheses of Huisgen "click" reactions are described extensively in the literature. The rationale for the present invention was to utilize solvothermal methods to generate 1-tetrazole, or 1-methyltetrazole groups in situ that would provide novel energetic coordination polymers (CPs). Specifically, the click reaction of an azide group with an alkyne or cyano group in solution at elevated temperatures generates a triazole or tetrazole linker between two small molecules. In the present invention, the unique combination of azide and choice of solvent enables synthesis of stabilized azide moieties. These energetic CPs may be utilized as "green" primaries and/or as novel high-energy, high-nitrogen explosive ingredients in formulations.

SUMMARY OF THE INVENTION

An embodiment of the invention describes an in-situ method of making an energetic compound represented by Formula 1: $Cu_4(C_8H_4N_5)_4(N_3)_4(H_2O)_2$. The in-situ method includes: combining 100 mg of copper nitrate hexahydrate, 1,4-dicyanobenzene and sodium azide in a ratio of 1:1:4 in 2 ml of ethanol to form a reagent mixture; adjusting pH of the reagent mixture by adding 40 µL of 10 molar potassium hydroxide; sealing the reagent mixture in a 23 mL Teflon-lined Parr reaction vessel and statically heating the Parr reaction vessel at 90° C. for 24-48 hours in an oven; removing the Parr reaction vessel from the oven and allowing the Parr reaction vessel to cool to room temperature; decanting a mother liquor to obtain a reaction product; and washing the reaction product with water and ethanol to obtain dark green/black crystals of the energetic compound.

Another embodiment of the invention describes an energetic compound represented by Formula 1: $Cu_4(C_8H_4N_5)_4(N_3)_4(H_2O)_2$, the local structure of which consists of three crystallographically unique copper atoms—Cu1, Cu2 and Cu3—bound by azide, 1-tetrazole, 4-cyanobenzene and water molecules, wherein: Cu1 is bound by two azide molecules via N9 and N9' that point share Cu2 and by two of the 1-tetrazole ligands via N3 and N3', resulting in a square planar geometry; Cu2 is bound by two azide molecules via N9 and N6, which point share with Cu1 and Cu3, respectively, by two 1-tetrazole ligands via N4 and N14 and by one water molecule Ow1, also resulting in a square planar geometry; and Cu3 is bound by two azide molecules via N6 and N6', and by two 1-tetrazole ligands via N13 and N13', further resulting in a square planar geometry.

Yet another embodiment of the invention describes a method of making an energetic compound represented by Formula 2: $Cu_4(C_2H_3N_4)_2(N_3)_6$. The method includes: combining 100 mg of copper nitrate hexahydrate, acetonitrile and sodium azide in a ratio of 1:1:4 in 2 ml of ethanol to form a reagent mixture; adjusting pH of the reagent mixture by adding 40 µL of 10 molar potassium hydroxide; sealing the reagent mixture in a 23 mL Teflon-lined Parr reaction vessel and statically heating the Parr reaction vessel at 90° C. for 24-48 hours in an oven; removing the Parr reaction vessel from the oven and allowing the Parr reaction vessel to cool to room temperature; decanting a mother liquor to obtain a reaction product; and washing the reaction product with water and ethanol to obtain dark green/black crystals of the energetic compound.

Yet another embodiment of the invention describes an energetic compound represented by Formula 2: $Cu_4(C_2H_3N_4)_2(N3)_6$, the local structure of which consists of two crystallo-graphically unique copper atoms—Cu1 and Cu2—bound by azide and 1-methyltetrazole molecules, wherein: Cu1 is bound by three azide molecules via N5, N8 and N11 that point share with other Cu1' or Cu2 atoms and by two of the 1-methyltetrazole ligands via N3 and N4', resulting in a square pyramidal structure; and Cu2 is bound by three azide molecules via N11, N14, and N14' that point share with other Cu1 or Cu2 atoms and by two of the 1-methyltetrazole ligands via N1 and N2, also resulting in a square pyramidal structure.

BRIEF DESCRIPTION OF THE DRAWINGS

Various non-limiting embodiments are further described with reference to the accompanying drawings in which.

DETAILED DESCRIPTION OF THE INVENTION

The present invention relates to methods for synthesizing first and second energetic compounds by generating in situ 1-tetrazole, and 1-methyltetrazole groups, respectively, to provide energetic coordination polymers (CPs).

CAUTION: The materials described within this disclosure are energetic. As such, care should be taken in handling the compounds upon formulation and manipulation. A potential and dangerous side product, that may be formed, is Copper Azide. Appropriate PPE should be worn at all times, including goggles, conductive shoes and a flame-resistant lab coat.

Synthesis of Energetic Compound 1, $Cu_4(C_8H_4N_5)_4(N_3)_4(H_2O)_2$

Energetic compound 1, $Cu_4(C_8H_4N_5)_4(N_3)_4(H_2O)_2$, was synthesized by in situ ligand synthesis of a tetrazole ligand and self-assembly of copper nitrate hexahydrate (100 mg), 1,4-dicyanobenzene and sodium azide at a ratio of 1:1:4 in 2 ml of ethanol. The pH of the reaction was adjusted by addition of 40 μL of 10 molar potassium hydroxide. The reagents were sealed in a 23 ml Teflon-lined Parr reaction vessel and heated statically at 90° C. for 24-48 hours in an oven. Upon removal from the oven, the Parr reaction vessel was allowed to cool to room temperature and a mother liquor was decanted from the reaction products, consisting of dark green/black crystals of energetic compound 1. The reaction products contained sodium azide, as a minor impurity, which was washed away with water and ethanol. Hammer tests performed on the isolated dark green/black crystals of energetic compound 1 gave positive results for energetic compounds in the form of a loud snap, light and the odor of burnt materials.

Figure 1:
FIG. 1 illustrates copper catalysis of an azide group with an alkyne or cyano group to generate a triazole or tetrazole linker between two small molecules, as shown in the exemplary "click" reaction of acetonitrile with azide to form 5-methyl tetrazole according to an embodiment of the invention.

It is of note that this synthesis relies on the in situ formation of tetrazole via Huisgen cycloaddition, i.e., the "click" reaction. Canonically, copper catalyzes the reaction of the azide group with an alkyne or cyano group at elevated temperatures in solution to generate a triazole or tetrazole linker between two small molecules, as shown in the exemplary "click" reaction of acetonitrile with azide to form 5-methyl tetrazole, as illustrated in FIG. 1.

Structure of Energetic Compound 1, $Cu_4(C_8H_4N_5)_4(N_3)_4(H_2O)_2$

Figure 2B:
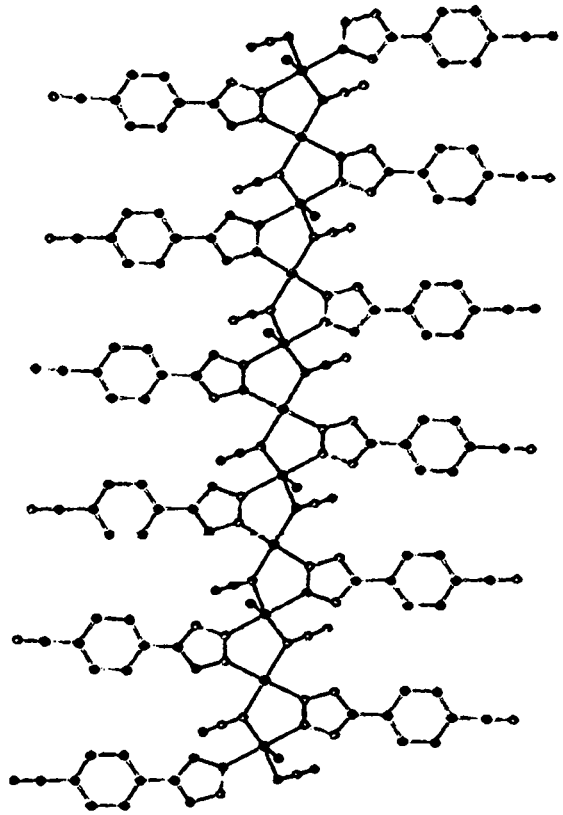
FIG. 2(b) illustrates the overall binding of the copper atoms by the azide and the 1-tetrazole molecules results in an extended chain topology according to an embodiment of the invention.
Figure 2A:
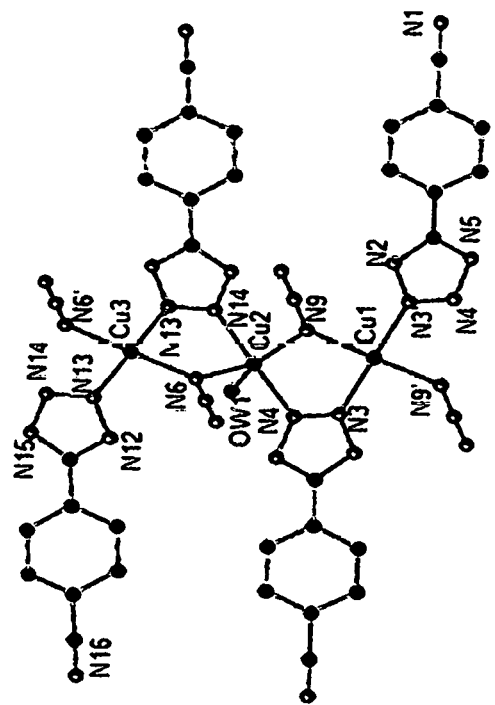
FIG. 2(a) illustrates three crystallographically unique copper atoms—Cu1, Cu2 and Cu3—bound by azide, 1-tetrazole, 4-cyanobenzene and water molecules according to an embodiment of the invention.

Compound 1, $Cu_4(C_8H_4N_5)_4(N_3)_4(H_2O)_2$, consists of three crystallographically unique copper atoms—Cu1, Cu2 and Cu3—bound by azide, 1-tetrazole, 4-cyanobenzene and water molecules, as shown in FIG. 2(b) wherein the local structure of Compound 1 labels copper and nitrogen atoms, while carbon, repeating atoms and non-binding azide atoms are left unlabeled for clarity. Cu1 is bound by two azide molecules via N9 and N9' that point share Cu2 and by two of the 1-tetrazole ligands via N3 and N3', resulting in a square planar geometry. Cu2 is bound by two azide molecules via N9 and N6, which point share with Cu1 and Cu3, respectively, by two 1-tetrazole ligands via N4 and N14 and by one water molecule Ow1, also resulting in a square planar geometry. Cu3 is bound by two azide molecules via N6 and N6', and by two 1-tetrazole ligands via N13 and N13', further resulting in a square planar geometry. The overall binding of the copper atoms by the azide and the 1-tetrazole molecules results in a chain topology, wherein the extended chain depicted in FIG. 1(b) omits the hydrogen atoms for clarity. The extended chain packs via supramolecular interactions, resulting in a 3-dimensional (3-D) structure.

Synthesis of Energetic Compound 2, $Cu_4(C_2H_3N_4)_2(N_3)_6$

Energetic compound 2, $Cu_4(C_2H_3N_4)_2(N_3)_6$, was synthesized by in situ ligand synthesis of a 1-methyltetrazole ligand and self-assembly of copper nitrate hexahydrate (100 mg), acetonitrile and sodium azide at a ratio of 1:1:4 in 2 ml of ethanol. The pH of the reaction was adjusted by addition of 40 μL of 10 molar potassium hydroxide. The reagents were sealed in a 23 ml Teflon-lined Parr reaction vessel and heated statically at 90° C. for 24-48 hours in an oven. Upon removal from the oven, the Parr reaction vessel was allowed to cool to room temperature and a mother liquor was decanted from the reaction products, consisting of dark green/black crystals of energetic compound 2. The reaction products contained sodium azide, as a minor impurity, which was washed away with water and ethanol. Hammer tests performed on the isolated dark green/black crystals of energetic compound 2 gave positive results for energetic compounds in the form of a loud snap, light and the odor of burnt materials.

Structure of Energetic Compound 2, $Cu_4(C_2H_3N_4)_2(N_3)_6$

Figure 3B:
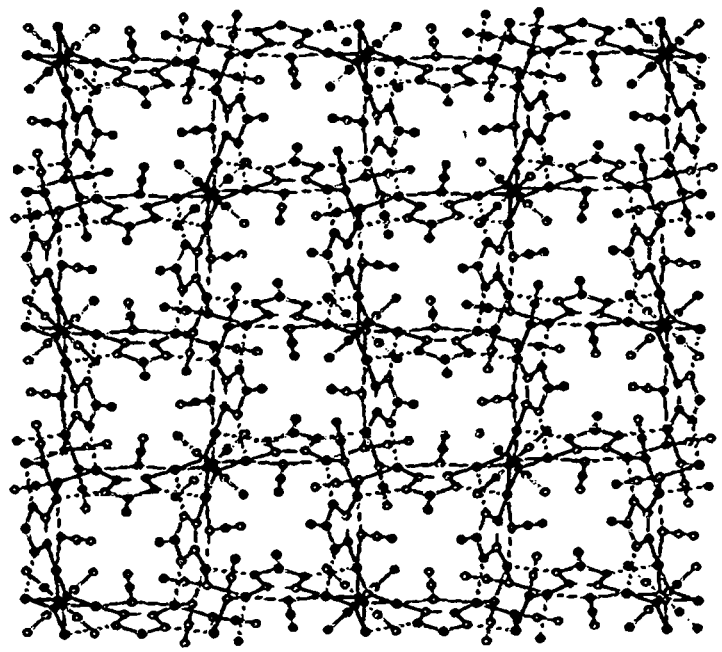
FIG. 3(b) illustrates the overall binding of the copper atoms by the azide and 1-methyltetrazole molecules results in a metal organic framework (MOF) according to an embodiment of the invention.
Figure 3A:
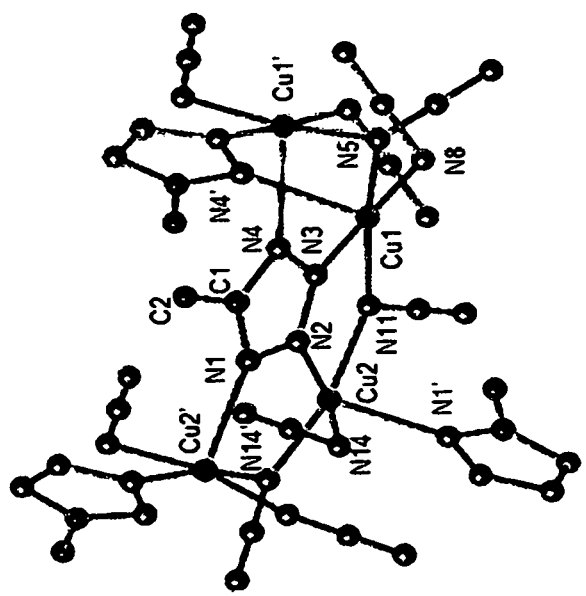
FIG. 3(a) illustrates two crystallographically unique copper atoms—Cu1 and Cu2—bound by azide and 1-methyltetrazole molecules according to an embodiment of the invention.

Energetic compound 2, $Cu_4(C_2H_3N_4)_2(N_3)_6$, consists of two crystallographically unique copper atoms—Cu1 and Cu2—bound by azide and 1-methyltetrazole molecules, as shown by FIG. 3(a), wherein the local structure of energetic compound 2 labels copper, nitrogen and carbon atoms, while repeating atoms and non-binding azide atoms are left unlabeled for clarity. Cu1 is bound by three azide molecules via N5, N8 and N11 that point share with other Cu1' or Cu2 atoms and by two of the 1-methyltetrazole ligands via N3 and N4', resulting in a square pyramidal structure. Cu2 is bound by three azide molecules via N11, N14, and N14' that point share with other Cu1 or Cu2 atoms and by two of the 1-methyltetrazole ligands via N1 and N2, also resulting in a square pyramidal structure. The overall binding of the copper atoms by the azide and 1-methyltetrazole molecules results in a metal organic framework (MOF) with pores on the scale of about 1.5 Angstroms, as shown in FIG. 3(b), wherein the hydrogen atoms are omitted for clarity.

The invention has been described with references to specific embodiments. While particular values, relationships, materials, and steps have been set forth for purposes of describing concepts of the invention, it will be appreciated by persons skilled in the art that numerous variations and/or modifications may be made to the invention as shown in the disclosed exemplary embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain embodiments and modifications of the concept underlying the present invention, various other embodiments as well as potential variations and modifications of the embodiments shown and described herein will obviously occur to those skilled in the art upon becoming familiar with such underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present embodiments are to be considered in all respects as illustrative and not restrictive.

The corresponding structures, materials, acts, and equivalents of all means or step plus function elements in the claims below are intended to include any structure, material, or act for performing the function in combination with other claimed elements as specifically claimed. The descriptions of the various exemplary embodiments herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A method of making an energetic compound comprising a local structure represented by Formula 1, $Cu_4(C_8H_4N_5)_4(N_3)_4(H_2O)_2$, comprising:
    combining 100 mg of copper nitrate hexahydrate, 1,4-dicyanobenzene and sodium azide in a ratio of 1:1:4 in 2 ml of ethanol to form a reagent mixture;
    adjusting pH of the reagent mixture by adding 40 μL of 10 molar potassium hydroxide;
    sealing the reagent mixture in a 23 mL Teflon-lined Parr reaction vessel and statically heating at 90° C. for 24-48 hours in an oven;
    removing the Parr reaction vessel from the oven and allowing the Parr reaction vessel to cool to room temperature;
    decanting a mother liquor from the reagent mixture, to obtain reaction products including the energetic compound; and
    washing the reaction products with water and ethanol to obtain dark green/black crystals of the energetic compound.

2. An energetic compound, comprising:
    a local structure represented by Formula 1: $Cu_4(C_8H_4N_5)_4(N_3)_4(H_2O)_2$, wherein the local structure consists of three crystallographically unique copper atoms—Cu1, Cu2 and Cu3—bound by azide, 1-tetrazole, 4-cyanobenzene and water molecules represented by Structure 1:

Structure 1

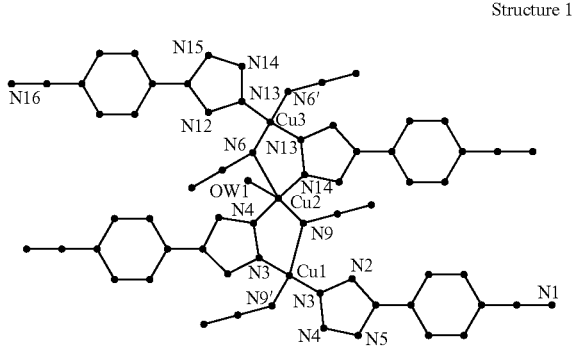

wherein, Cu1 is bound by two azide molecules via N9 and N9' that point share Cu2 and by two of the 1-tetrazole ligands via N3 and N3', resulting in a square planar geometry;
Cu2 is bound by two azide molecules via N9 and N6, which point share with Cu1 and Cu3, respectively, by two 1-tetrazole ligands via N4 and N14 and by one water molecule Ow1, also resulting in a square planar geometry; and
Cu3 is bound by two azide molecules via N6 and N6', and by two 1-tetrazole ligands via N13 and N13', further resulting in a square planar geometry.

3. The energetic compound of claim 2, wherein the overall binding of the copper atoms by the azide and the 1-tetrazole ligands of many local structures results in an extended chain topology.

4. The energetic compound of claim 3, wherein the extended chain topology packing via supramolecular interactions forms a 3-dimensional structure.

5. A method of making an energetic compound represented by Formula 2, $Cu_4(C_2H_3N_4)_2(N_3)_6$, comprising:
    combining 100 mg of copper nitrate hexahydrate, acetonitrile and sodium azide in a ratio of 1:1:4 in 2 ml of ethanol to form a reagent mixture;
    adjusting pH of the reagent mixture by adding 40 μL of 10 molar potassium hydroxide;
    sealing the reagent mixture in a 23 mL Teflon-lined Parr reaction vessel and statically heating at 90° C. for 24-48 hours in an oven;
    removing the Parr reaction vessel from the oven and allowing the Parr reaction vessel to cool to room temperature;
    decanting a mother liquor from the reagent mixture, to obtain reaction products including the energetic compound; and
    washing the reaction products with water and ethanol to obtain dark green/black crystals of the energetic compound.

6. An energetic compound, comprising:
    a local structure being represented by Formula 2: $Cu_4(C_2H_3N_4)_2(N_3)_6$, wherein the local structure consists of two crystallographically unique copper atoms—Cu1 and Cu2—bound by azide and 1-methyltetrazole molecules represented by Structure 2:

Structure 2

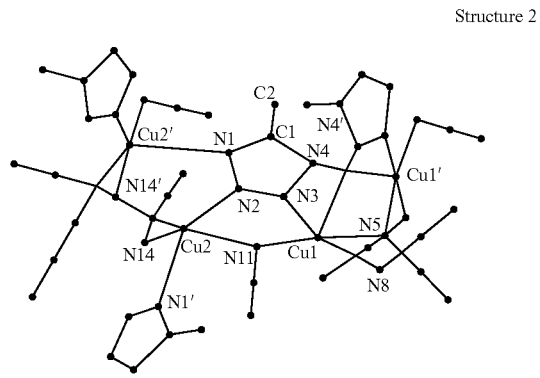

wherein,
Cu1 is bound by three azide molecules via N5, N8 and N11 that point share with other Cu1' or Cu2 atoms and by two of the 1-methyltetrazole ligands via N3 and N4', resulting in a square pyramidal structure; and
Cu2 is bound by three azide molecules via N11, N14, and N14' that point share with other Cu1 or Cu2 atoms and by two of the 1-methyltetrazole ligands via N1 and N2, also resulting in a square pyramidal structure.

7. The energetic compound of claim 6, overall binding of the copper atoms by the azide and the 1-methyltetrazole ligands of many local structures of the energetic compound resulting in a metal organic framework (MOF) with pores on the scale of about 1.5 Angstroms.

* * * * *